Patented Sept. 15, 1953

2,652,342

UNITED STATES PATENT OFFICE 2,652,342

SYNTHETIC DRYING OIL AND ENAMEL PAINT AND PROCESS OF MAKING SAME

Anthony H. Gleason, Westfield, N. J., assignor to Standard Oil Development Company, a corporation of Delaware No Drawing. Application July 1, 1949, Serial No. 102,703

8 Claims. (Cl. 106—285)

This invention relates to a synthetic drying oil composed of an oily copolymer of butadiene and styrene combined with a small amount of maleic anhydride or its equivalent and an enamel containing this oil.

Synthetic drying oils can be prepared by various methods from butadiene alone or from mixtures containing butadiene together with materials copolymerizable therewith. Sodium polymerization, emulsion polymerization as well as bulk polymerization in the presence of a diluent and a peroxide type catalyst have been used for this purpose with varying degrees of success. However, among the difficulties encountered with various synthetic drying oils were poor drying rate, poor flexibility, poor adhesion of air-dried coatings, poor wetting properties and consequent difficulty of grinding in pigments, poor gloss and streakiness of brushed enamel films. And while some of these disadvantages have been overcome in the past, this usually resulted in aggravation of other undesirable characteristics. In general the sodium catalyzed polymers have been found to be most economical to produce and to have a good drying rate, but at the same time this type of drying oil was found to have particularly poor pigment wetting power and enamels prepared therefrom gave dull and very streaky films by brushing. It has now been discovered that these disadvantages of sodium polymerized synthetic drying oils can be overcome by reacting the drying oil with an anhydride of an unsaturated dicarboxylic acid such as maleic anhydride, chloro-maleic anhydride or citraconic anhydride. The treatment with maleic anhydride has been found to be especially effective.

For the purposes of this invention it is particularly desirable to use drying oils which have been obtained by copolymerizing 60 to 90 parts of butadiene-1,3 with 40 to 10 parts of styrene, preferably about 75 to 85 parts of the former and 25 to 15 parts of the latter, the polymerization being carried out at 20 to 100° C., preferably below the melting point of the catalyst or between 65 and 85° C., in a reaction diluent. Temperatures near the lower end of the range set forth are generally more suitable for batch polymerizations and temperatures near the upper end of the range are particularly suited for continuous operation. As a polymerization catalyst about 0.1 to 10 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight run mineral spirits such as Varsol (boiling range 150 to 200° C.), inert hydrocarbon diluents such as butane, xylene, benzene, toluene, cyclohexane or the like, individually or in admixture with each other. To be suitable for the polymerization reaction here involved, the diluents should have a boiling range within the limits of about $-15°$ C. and 200° C. The diluents are usually used in amounts ranging from 50 to 500, preferably 200 to 300 parts per 100 parts of monomers.

Instead of using inert diluents, it is also possible to use modifying diluents such as butene-2 or other low boiling olefins which modify the reaction by limited copolymerization and chain termination. Various ethers having more than two carbon atoms per molecule such as diethyl ether, diisopropyl ether dioxane, vinyl ethyl ether, vinyl isopropyl, vinyl isobutyl ether, anisole, phenetole and other ethers of various types are also useful as diluents and are particularly helpful as co-diluents to insure formation of colorless products when used in amounts ranging from about 10 to 35 parts per 100 parts of monomers, together with the aforesaid amount of inert diluent such as solvent naphtha. p-Dioxane, m-dioxane and their various methyl and ethyl homologues are particularly preferred. In selecting the ether co-diluent it is especially desirable to select an ether having a boiling point at least 10° C. below the lower limit of the boiling range of the hydrocarbon diluent and thus, when using Varsol, ether co-diluents boiling between about 25 and 140° C. are preferred in order to permit its ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes or diethyl styrenes. In particular it is desirable to add the styrene monomer to the reaction mixture only after the polymerization of the butadiene has been initiated. By this expedient the induction period is quite substantially reduced, and the polymer produced is gel-free and of desirably low viscosity as opposed to a more viscous product obtained when the styrene monomer is present in the reaction mixture from the beginning.

Especially where a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 100° C. with a catalyst particle size of less than 100 microns diameter. While sodium is preferred similar catalysts such as potassium, sodium hydride, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation and equal conversion.

Destruction of catalyst at the end of the reaction is effectively accomplished by adding to the reactor a moderate excess of alcohol, e. g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer, and the neutralized product is then filtered with a filter aid such as silica gel, clay, charcoal or its equivalent.

In the preferred modification the clear colorless filtrate is then fractionally distilled to remove first the alcohol-hydrocarbon azeotropes and then the dioxane-hydrocarbon azeotropes. Finally, if the polymerization is carried out in a relatively large amount of hydrocarbon diluent so that the resulting polymer solution is too dilute for use as a varnish or enamel base, it is desirable to distill off additional hydrocarbon until a product containing about 50% non-volatile matter is obtained, the non-volatile matter being the polymeric drying oil. The resulting product, being a solution of polymeric drying oil in a suitable hydrocarbon solvent such as solvent naphtha or mineral spirits, is a clear colorless varnish composition having a viscosity between about 0.5 and 5 poises at 50% non-volatile matter. The Staudinger molecular weight of the non-volatile or polymeric constituents of the product usually falls between about 2,000 to 5,000, corresponding to an intrinsic viscosity of about 0.15 to 0.3. Such clear varnish compositions can be brushed, poured or sprayed and give good clear films on drying in air or baking, especially when conventional driers such as the naphthenates or octoates of cobalt, lead or manganese, are added thereto.

However, while drying oil compositions of the type described above give a good varnish, they are poor wetting vehicles for pigments and give enamels that produce films which lack gloss, are streaky when brushed and wherein the pigments tend to agglomerate. Moreover, a particularly disturbing fact has been that under seemingly identical conditions products were obtained whose gloss and wetting power were entirely dissimilar, ranging from extremely poor to fair. Wetting agents such as aromatic sulfonates or diamines such as octadecyl diethenyl diamine, as well as polar and non-polar solvents such as acetone or various alcohols were found to be ineffective in overcoming the aforesaid disadvantages when added to the drying oil compositions.

It has now been discovered that these disadvantages characteristic of the aforementioned drying oils can be eliminated and that drying oils of uniformly excellent pigment wetting power resulting in enamels of uniformly excellent gloss can be obtained when the oils are made to contain about 0.01 to 2.5%, preferably 0.05 to 0.5% of maleic anhydride or similar unsaturated anhydrides listed earlier herein. This beneficial treatment with maleic anhydride may be carried out either by adding the aforesaid amount of maleic anhydride to the hydrocarbon monomers prior to or during the synthesis of the drying oil, or a similar result can be obtained even more efficiently by adding the stated amount of maleic anhydride to the finished polymer and heating the mixture at 50 to 250° C., temperatures between 180 and 220° C. being preferred. The necessary reaction time for such after-treatment varies between about 15 minutes and 2 hours depending on the temperature employed. In particular it is to be noted that the aforementioned amount of maleic anhydride is very critical in that amounts in excess of 1.0% of maleic anhydride on monomers cause an increasingly serious retardation of the drying rate of the resulting product, which, though not too apparent with a freshly treated oil, becomes quite pronounced if the treated oil is allowed to age for a few days or weeks in cans before being applied as a protective coating. Drying oils treated with more than 2.5% are so slow drying as to be useless for all practical considerations, unless still further treated or specially compounded.

The following examples are presented as specific illustrations of the present invention. All quantities described in this specification and the appended claims as "parts" or "percent" refer to "parts by weight" or "percent by weight" unless expressly stated otherwise.

EXAMPLE

*Run A.*—A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150 to 200° C.; solvent power, 33–37 kauri-butanol value (reference scale: benzene—100 K. B. value, n-heptane 25.4 K. B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% non-volatile matter as described in earlier parts of this specification. The resulting product had a viscosity of 0.9 poise and the non-volatile portion thereof had an average molecular weight of about 3,000.

*Run B.*—When run A was duplicated using the same charge and identical conditions as far as possible, a finished product was obtained having a viscosity of 1.2 poises at 50% non-volatile matter.

*Runs C–F.*—In still other duplicate runs, finished products were obtained having viscosities as shown in Table I. Run E, wherein a product of rather high viscosity was obtained, differed from the other runs in that 350 parts of diethyl ether were used as a diluent in place of dioxane and because of this change an induction period of about three hours resulted. It has been found to be generally true that long induction periods bring about products whose eventual viscosity is very substantially higher than when the induction period is kept short.

All of the drying oil products described above gave excellent, protective coatings when applied as a clear varnish to steel, wood and other conventional surfaces. Films containing customary small amounts of driers such as 0.05% cobalt, 0.05% manganese and 0.5% lead in the form of naphthenates, applied by pouring or brushing the clear varnish, had good drying rates in that they were generally set to touch in 2 to 4 hours and became tack-free in 10 to 24 hours. The resulting dry films were hard, smooth, glossy, unaffected by water, grease or caustic and only slightly discolored by soap.

However, when these same oils were used for the preparation of enamels by incorporating therein pigments such as titanium oxide, the results were unsatisfactory both because an unduly large amount of oil was required on the pigment grinding mill to form a smooth, homogeneous paste and because of the uncontrollable lack of gloss and poor leveling of films formed from the resulting enamels as described below.

The drying oils involved were evaluated on a water-cooled laboratory pigment mill comprising three consecutive rolls revolving at differential speeds, the first roll being the slowest and the third roll being the fastest. In accordance with conventional practice, the oil and pigment paste is placed between the first and second revolving rolls, ground and carried off. It will be understood that the lowest possible ratio of oil to pigment, also known as "paste factor," is desired in industry in order to allow the most rapid mill throughput possible. Once the paste is formed, it is thereafter readily thinned out to the required consistency by simply mixing it with additional amounts of oil. The formula used in this enamel evaluation was:

100 g. $TiO_2$ [1]
200 g. synthetic drying oil, 50% N. V. M. in Varsol
0.05% Co [2]
0.05% Mn [2]
0.5% Pb [2]

[1] Ti—Pure R610.
[2] Driers in the form of naphthenates.

The enamels were applied to steel panels both by pouring and by brushing, and the gloss of the resulting dried enamel films as well as presence or absence of brush marks were observed. These data as well as the paste factor of each drying oil tested are shown in Table I, whence it can be seen that the synthetic drying oils prepared as described above are poor vehicles for enamels, giving an unduly high paste factor and dried films of poor, erratic gloss and poor leveling.

The improvement obtainable in accordance with the present invention is illustrated by the subsequent runs.

*Run M.*—The finished drying oil obtained from run A having 50% non-volatile matter content and a viscosity of 0.9 poise was subjected to an after-treatment which consisted of refluxing the oil at 175° C. for 2 hours in the presence of 0.1% of maleic anhydride. The resulting oily product was perfectly clear and water-white, had approximately the same viscosity and satisfactory drying rate as the original oil, but had very much better wetting and leveling characteristics than the latter. Titanium oxide enamels prepared from the treated oil using the formula given earlier herein resulted in coatings of excellent gloss.

*Run N.*—When one part of the treated oil obtained in run M was blended with four parts of the untreated oil obtained in run A, thereby obtaining an oil having an average maleic anhydride content of 0.02%, the blend retained all the advantages of the undiluted maleic anhydride treated oil to a very large degree, indicating that a surprisingly minute amount of maleic anhydride is sufficient for the purposes of the present invention.

*Run O.*—In this instance the finished drying oil of run A was subjected to an after-treatment which consisted of refluxing the oil at 175° C. for 2 hours in the presence of 1.0% of maleic anhydride. The resulting clear, water-white product had a paste factor of 37.2, which is about as good as that of the best natural drying oils and represents a very important improvement compared to the untreated oil which had a paste factor of 121.5. The drying rate, leveling, enamel gloss and all other important characteristics of the treated oil were very satisfactory.

*Run P.*—When one part of the treated oil obtained in run O was blended with three parts of the untreated oil of run A, thereby obtaining an oil having an average maleic anhydride content of 0.25%, the blend had substantially the same favorable properties as the oil of run O, except for a slight rise in paste factor from 37 to 41.

*Run Q.*—It was found possible to improve the paste factor still further by increasing the maleic anhydride concentration. However, as shown in Table I, such an increase of maleic anhydride content increases the difficulty of completing the reaction of the anhydride with the oil and residual uncombined anhydride tends to have an adverse effect on the drying rate of the product.

*Run R.*—Instead of incorporating the maleic anhydride in the oil in a separate post-synthesis step, it is possible to obtain a similar improvement by adding a suitable amount of maleic anhydride to the reaction mixture when the oil is being synthesized. This alternative procedure is illustrated below.

Run A was duplicated, except that this time the isopropyl alcohol was omitted and instead 0.25% of maleic anhydride was added to the polymerizable feed in accordance with the invention. The induction period was increased to about 5 hours and the total polymerization time at 60° C. extended to about 18 hours in order to obtain 100% conversion. When the resulting reaction mixture was finished as previously described and reduced to 50% non-volatile matter content, a drying oil was obtained having a viscosity of about 3.3 poises, but was faintly off-color and somewhat cloudy. When this product was used for the preparation of enamels following the formula and procedure given earlier, a satisfactory paste factor and films of excellent gloss and leveling characteristics were obtained as shown in Table I. The drying rate of the enamel was satisfactory, being originally the same as with the unmodified drying oils obtained in runs A to F.

*Run S.*—When run R was repeated, this time adding 1.5% parts of maleic anhydride to the feed, the reaction time was further increased to about 20 hours. The finished drying oil had a viscosity of about 11 poises at 50% N. V. M. content, relatively high viscosities being characteristic of long induction periods. The oil again was slightly cloudy and off-color. This product wetted pigments very well, gave enamel films of excellent properties as in run R, and the enamel prepared from this drying oil had a satisfactory drying rate.

*Run T.*—When run R was repeated once more, this time adding 3% of maleic anhydride to the polymerizable feed, a conversion of only 7% was obtained and the amount of drying oil produced was insufficient to permit any evaluation.

Incidentally it was observed in the course of the present investigation that even in the absence of maleic anhydride, gloss and leveling of an unsatisfactory drying oil can be improved somewhat by mere heating at a temperature between about 120 and 200° C. for a period of about 1½ to 5 hours in the substantial absence of air or oxygen, without thereby increasing the viscosity of the oil. This is illustrated by run U in Table I. Such heat treatment, however, does not improve the paste factor of the oil nearly as much as treatment with maleic anhydride. At temperatures above 200° C., and notably at temperatures above 250° C. such heat treatment also causes bodying of the oil, which phenomenon can be made use of if oils of higher viscosity are desired.

All results are summarized in Table I.

the exception of enamel B and to some extent enamel E, the untreated enamels gave dried films characterized by unsatisfactory gloss and poor leveling. The excellent characteristics of the dried films from enamel B have defied explanation and could not be obtained again in other runs despite repeated and painstaking efforts to duplicate exactly all conditions which prevailed in the synthesis of the oil used in run B. This illustrates the impossibility of obtaining a product of consistent quality by careful control of the unmodified drying oil synthesis. At the same time run E shows that a satisfactorily glossy and level film was obtained in this instance by brushing although the poured film was dull like an eggshell, a possible explanation for this difference in behavior being that under some unknown conditions excessive agglomeration of pigment can be prevented by a sufficient expenditure of energy in applying the enamel to the surface.

In contrast to the unsatisfactory and erratic results of runs A to F, tabulated runs M to S show that the oils treated in accordance with the present invention possess excellent pigment wetting power and give dried enamel films of excellent gloss and leveling characteristics, regardless whether the maleic anhydride is incorporated in the oily polymer in the original synthesis or in a separate after-treatment of a finished drying oil.

Runs R-T show that satisfactory modification of the synthetic drying oil can be obtained by adding the maleic anhydride directly to the feed and thus eliminating a separate post-synthesis treatment. However, it should be remembered that the apparently simplified one-step process involving addition of anhydride to the feed entails a material increase in required reaction time and results in a product of relatively high viscosity as well as somewhat inferior color and clarity. In general, therefore, modification by post-synthesis treatment has been found to be much more advantageous and modification by adding anhydride to the feed is recommended only where a one-step operation is preferred

*Table I*

ENAMEL EVALUATION

| Enamel (Run No.) | Percent Maleic Anhydride | Oil viscosity (Poises) | Paste Factor, g. Oil per 100 g. Pigment | Gloss Poured Film | Gloss Brushed Film | Leveling (Absence of BrushMarks) | Drying Rate | |
|---|---|---|---|---|---|---|---|---|
| | | | | | | | Set-To-Touch | Tack-Free |
| | | | | | | | *Hours* | *Hours* |
| A | None | 0.9 | 121.5 | Flat | Egg Shell | Poor | 4-6 | <24 |
| B | None | 1.2 | 122.5 | Excellent | Excellent | Excellent | 4-6 | <24 |
| C | None | 0.5 | 142.0 | Flat, Seedy | Fair | Poor | 4-6 | >24<48 |
| D | None | 0.8 | 154.7 | Flat | do | do | 4-6 | <24 |
| E | None | 7.0 | 172 | Egg Shell | Excellent | Excellent | 4-6 | >24 |
| F | None | 1.0 | 111.0 | Fair, Pebbly | Fair | Poor | 4 | <24 |
| N | ᵇ 0.02 | 1.0 | 86.0 | Excellent | Excellent | Excellent | 6 | <24 |
| M | ᵇ 0.1 | 1.0 | 70.0 | do | do | do | 2-4 | <24 |
| P | ᵇ 0.25 | 1.0 | 41.0 | do | do | do | 6 | <24 |
| O | ᵇ 1.0 | 1.0 | 37.2 | do | do | do | 6 | <24 |
| Q | ᵇ 2 | 1.0 | 36.5 | do | do | do | 24 | >24 |
| R | ᵃ 0.25 | 8.8 | 67 | do | do | do | ᵈ 6 | ᵈ<24 |
| S | ᵃ 1.5 | 11 | 47 | do | do | do | ᵈ 6 | ᵈ<24 |
| T | ᵃ 3.0 | | | | | | | |
| U | ᶜ None | 1.0 | 94.3 | Excellent | Excellent | Excellent | 4 | 24 |

ᵃ Anhydride added to monomer feed.
ᵇ Anhydride reacted with finished drying oil product.
ᶜ Heat treatment of finished drying oil for 2 hours at 145° C.
ᵈ After aging.

Runs A-F listed in Table I show that all the untreated synthetic drying oils had paste factors of 111 and higher, whereas in industry values between 20 and 90, preferably between 20 and 50, are usually specified. Furthermore, with even at the cost of increased over-all reaction time and at the further cost of some impairment of product quality.

Coating compositions can be prepared from the oils of the invention to meet varying specifications. In particular they accept readily all types of toner colors as well as organic and inorganic pigments such as titanium oxide, chrome green, carbon black, red lead, toluidine and lithol reds, iron and phthalocyanine blues, chrome yellows hansa yellows. Depending on the type of pigment employed and eventual use contemplated, the concentration of pigment may be varied in various enamels within very broad ranges such as between 5 and 75% based on the weight of non-volatile polymeric constituents of the drying oil base. For example, carbon black is usually used in concentrations ranging from 6 to 10%, titanium dioxide 40 to 60%, and lead pigments in even higher concentrations. Of course, in preparing the initial paste concentrations as high as 300 parts of pigment per 100 parts of drying oil base are not uncommon. The compositions can be extended or mixed with suitable hydrocarbon solvents boiling between about 80 and 200° C. which solvents may be of the type used as reaction diluents in the oil synthesis aforesaid or with other solvents such as Varsol, xylene, mineral spirits, naphthas, and Solvesso, white oils, as well as mixed aromatics in the benzene and xylene range.

Furthermore, while the anhydride treated oily products of the invention by themselves yield protective coatings having well balanced properties, they can be modified further by mixing therewith other drying oils such as linseed oil, tung oil, soybean oil or other unsaturated vegetable oils. Often it is also advantageous to produce a master batch of synthetic drying oil treated with a relatively large amount of maleic anhydride, e. g., up to 5 or even 10%, and then, similarly as in runs N and O, cut back the master batch with an additional amount of drying oil to yield a drying oil having an average maleic anhydride content below about 1.0%. The drying oil used for cutting back the master batch may conveniently be a synthetic butadiene polymer or copolymer not treated with maleic anhydride, e. g., a butadiene-styrene drying oil as described earlier herein, or the oil may be of natural origin. In this fashion treated oil can be cut back with untreated oil to obtain a blend having any desired overall combined anhydride content and such blends have been found to have approximately the same properties as if all of the oil had been reacted with the desired amount of anhydride originally. When desired, the products of the invention can also be mixed with various resins such as rosin and ester gum to obtain protective coatings having special characteristics.

Having fully described the invention, it will be understood that various embodiments or modifications not specifically illustrated herein are possible without departing from the spirit of the invention or from the scope of the appended claims.

I claim:

1. An enamel base comprising an oily sodium copolymer of 75 to 85 parts of butadiene-1,3, 25 to 15 parts of styrene and 0.05 to 0.5 part of maleic anhydride combined therewith, said copolymer having an intrinsic viscosity between about 0.15 and 0.30.

2. An enamel base according to claim 1 wherein the copolymer is dissolved in an inert hydrocarbon solvent boiling between about 80 and 200° C., the resulting solution containing about 20 to 300 parts of copolymer per 100 parts of solvent.

3. An enamel paint comprising about 5 to 300 parts of pigment per 100 parts of liquid base having a viscosity of about 0.5 to 5 poises, said liquid base consisting essentially of an oily sodium copolymer of 75 to 85 parts of combined butadiene-1,3, 25 to 15 parts of combined styrene and 0.05 to 0.5 part of combined maleic anhydride dissolved in an inert hydrocarbon solvent boiling between about 80 and 200° C.

4. An enamel paint comprising about 100 parts of titanium oxide pigment, about 100 parts of mineral spirits boiling between 150 and 200° C., about 100 parts of a sodium copolymer drying oil composed of about 80 parts of combined butadiene, 20 parts of combined styrene and 0.05 to 0.5 part of combined maleic anhydride and having an intrinsic viscosity of about 0.2, and 0.05 to 1% of at least one drier selected from the group consisting of lead, cobalt and manganese naphthenate.

5. A process for improving a polymeric drying oil prepared by copolymerization of 75 to 85 parts of butadiene-1,3 and 25 to 15 parts of styrene in the presence of metallic sodium, which process comprises mixing a solution containing 20 to 80 percent of said oil in an inert hydrocarbon solvent boiling between 150 and 250° C. with 0.05 to 1.0 part of maleic anhydride per 100 parts of polymeric drying oil, and heating the resulting mixture at 200 to 220° C.

6. A process for preparing an improved drying oil which comprises the step of heating an oily sodium copolymer of 75 to 85 parts of butadiene and 25 to 15 parts of styrene with 2.5 to 10% of maleic anhydride at a temperature between 175 and 250° C. and blending the resulting product with an untreated drying oil in an amount sufficient to reduce the maleic anhydride content of the blend to a value below about 1%.

7. A drying oil consisting essentially of an oily sodium copolymer which is composed of the following ingredients in the combined state: 75 to 90% butadiene, 25 to 10% styrene, and 0.01 to 2.5% of an anhydride selected from the group consisting of maleic, chloro-maleic, and citraconic anhydride, said oily copolymer having an intrinsic viscosity between about 0.15 and 0.3.

8. A drying oil consisting essentially of a sodium copolymer of 75 to 90 parts of a $C_4$ to $C_6$ conjugated diolefin, 25 to 10 parts of styrene, and 0.01 to 1.5 parts of maleic anhydride, said copolymer having an intrinsic viscosity between about 0.15 and 0.3.

ANTHONY H. GLEASON.

References Cited in the file of this patent

UNITED STATES PATENTS

| Number | Name | Date |
|---|---|---|
| 2,188,882 | Clocker | Jan. 30, 1940 |
| 2,252,333 | Rothrock | Aug. 12, 1941 |
| 2,384,085 | Gerhart | Sept. 4, 1945 |
| 2,457,872 | D'Alelio | Jan. 4, 1949 |
| 2,473,538 | McIntire | June 21, 1949 |